United States Patent
Mossoba et al.

(10) Patent No.: US 10,311,414 B1
(45) Date of Patent: Jun. 4, 2019

(54) AUTOMATED TELLER MACHINES (ATMS) HAVING OFFLINE FUNCTIONALITY

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/976,662

(22) Filed: May 10, 2018

(51) Int. Cl.
*G06Q 40/00* (2012.01)
*G06Q 20/10* (2012.01)
*G06Q 20/38* (2012.01)
*G06Q 20/40* (2012.01)

(52) U.S. Cl.
CPC ....... *G06Q 20/1085* (2013.01); *G06Q 20/382* (2013.01); *G06Q 20/401* (2013.01)

(58) Field of Classification Search
CPC ................................................. G06Q 20/1085
USPC ..................................... 705/35–45
See application file for complete search history.

(56) References Cited

U.S. PATENT DOCUMENTS

| | | | | |
|---|---|---|---|---|
| 6,014,649 A | * | 1/2000 | Kobayashi | G06Q 20/108 |
| | | | | 705/42 |
| 8,381,969 B1 | * | 2/2013 | Miller | G06Q 20/401 |
| | | | | 235/375 |
| 2007/0143225 A1 | | 6/2007 | Hamilton et al. | |
| 2010/0030696 A1 | | 2/2010 | Naccache | |
| 2011/0087611 A1 | | 4/2011 | Chetal | |
| 2011/0251956 A1 | * | 10/2011 | Cantley | G06Q 20/042 |
| | | | | 705/43 |
| 2015/0222145 A1 | * | 8/2015 | MacInnes et al. | H02J 9/06 |
| | | | | 307/65 |

* cited by examiner

*Primary Examiner* — Chia-Yi Liu
(74) *Attorney, Agent, or Firm* — Harrity & Harrity, LLP

(57) ABSTRACT

A device may receive customer data, and store the customer data in a secure memory device of the device. The device may implement a backup mode in which the device utilizes the customer data to authorize requests based on determining that the device lacks a network connection. The device may receive, when the device is in the backup mode, a request for currency that includes authentication information. The device, while in the backup mode, may authorize the request for currency based on comparing the authentication information and the customer data. The device may dispense currency based on a result of comparing the authentication information and the customer data. The device may store transaction data associated with dispensing of the currency to permit the transaction data to be transmitted when the network connection is restored.

20 Claims, 7 Drawing Sheets

AUTOMATED TELLER MACHINES (ATMS) HAVING OFFLINE FUNCTIONALITY

BACKGROUND

An automated teller machine (ATM) is an electronic device that enables customers of financial institutions to perform financial transactions. For example, the financial transactions may include cash or currency withdrawals, cash or currency deposits, transfer of funds, or obtaining account information. As the ATM operates in an automated fashion, such financial transactions may be generally performed at any time of day and/or any day of the week, electronically, and without the need for direct interaction with bank staff.

SUMMARY

According to some possible implementations, a method may include receiving, by a processor of an automated teller machine (ATM), customer data. The method may include storing, by the processor, the customer data in a secure memory device of the ATM. The method may include determining, by the processor, that the ATM lacks a network connection. The method may include implementing, by the processor, a backup mode in which the ATM utilizes the customer data to authorize requests based on determining that the ATM lacks the network connection. The method may include receiving, by the processor and when the ATM is in the backup mode, a request for currency. The request for currency may include authentication information. The method may include authorizing, by the processor and when the ATM is in the backup mode, the request for currency based on comparing the authentication information and the customer data that is stored in the secure memory device of the ATM. The method may include dispensing currency based on a result of comparing the authentication information and the customer data and storing transaction data associated with dispensing of the currency to permit the transaction data to be transmitted when the network connection is restored.

According to some possible implementations, an ATM may include a secure memory device configured to locally store customer data at the ATM and one or more processors. The one or more processors of the ATM may be configured to determine that the ATM is disconnected from a primary power source and lacks a network connection. The one or more processors of the ATM may be configured to implement a backup battery mode based on determining that the ATM is disconnected from the primary power source and lacks the network connection. One or more ATM components may receive electrical power from a battery when the ATM is in the backup battery mode. The one or more processors of the ATM may be configured to receive a request for currency when in the backup battery mode. The request for currency may include authentication information. The one or more processors of the ATM may be configured to authorize the request for currency when the in the backup battery mode based on comparing the authentication information and the customer data that is stored in the secure memory device of the ATM. The one or more processors of the ATM may be configured to generate and store transaction data associated with the dispensing of the currency to permit the transaction data to be transmitted when the ATM is connected to the primary power source and the network connection is restored. The transaction data may be linked to the customer data using a transaction identifier.

According to some possible implementations, a non-transitory computer-readable medium may store one or more instructions that, when executed by one or more processors, cause the one or more processors to store customer data in a secure memory device of an ATM. The one more instructions, when executed by the one or more processors, may cause the one or more processors to determine that the ATM is disconnected from a primary power source and lacks a network connection. The one more instructions, when executed by the one or more processors, may cause the one or more processors to implement a backup battery mode in which a battery is configured to electrically power one or more ATM components based on determining that the ATM is disconnected from the primary power source and lacks the network connection. The one more instructions, when executed by the one or more processors, may cause the one or more processors to receive, when the ATM is in the backup battery mode, a request for currency. The request for currency may include authentication information. The one more instructions, when executed by the one or more processors, may cause the one or more processors to authorize, when the ATM is in the backup battery mode, the request for currency based on a comparison of the authentication information and the customer data that is stored in the secure memory device. The one more instructions, when executed by the one or more processors, may cause the one or more processors to determine a maximum value of currency to be dispensed based on authorizing the request for currency. The maximum value of the currency may be based on a real-time value of a total amount of currency available for dispensing by the ATM. The one more instructions, when executed by the one or more processors, may cause the one or more processors to generate transaction data associated with the authorized request and store the transaction data associated with the authorized request in the secure memory device of the ATM.

DETAILED DESCRIPTION

Figure 1A:
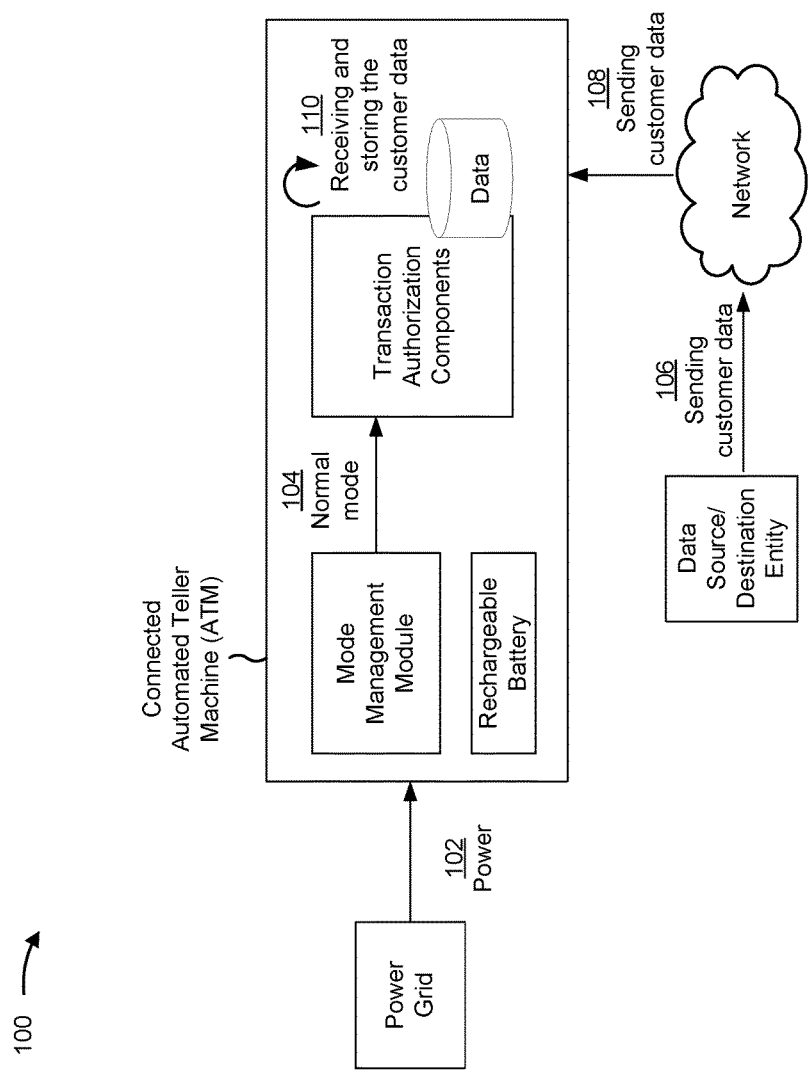
FIGS. 1A-1C are diagrams of an overview of an example implementation described herein.

The following detailed description of example implementations refers to the accompanying drawings. The same reference numbers in different drawings may identify the same or similar elements.

When access to a primary power source (e.g., the grid) and/or communication infrastructure (e.g., a network) is interrupted or fails, existing automated teller machines (ATMs) that are owned or operated by a provider (e.g., a banking provider, a financial services provider, and/or the like) lose all functionality. Losses in ATM functionality prevent the provider's account holders or customers from accessing the currency (i.e., money or cash) in their accounts. During dire or emergency situations, such as, for example, situations resulting from a natural disaster, losses in ATM functionality may further exacerbate problems, which may result in hardship and fear on the part of customers. Furthermore, where a large number of ATMs are affected, such losses of functionality may result in widespread panic.

Some implementations described herein include ATMs that are capable of receiving, authorizing, and completing a request for currency despite losses or disruptions in the primary power source and/or communication infrastructure. That is, the ATMs described herein are operable to authorize requests for currency and additionally dispense the currency to the provider's customers even during a network outage (i.e., where the ATM is offline), a power outage (i.e., where the ATM is disconnected from the primary power source), or a combination of a network outage and a power outage.

Furthermore, in some implementations, the ATMs described herein are operable in one or more of a plurality of different modes in response to detecting a power outage, a network outage, or both. For example, the ATMs described herein may operate in a normal mode when connected to the primary power source and the network, and further selectively operate in any one of a plurality of alternative modes when disconnected from the primary power source and/or the network. In some implementations, for example, the ATMs described herein are operable in a backup mode when the ATM is disconnected from the network, a battery mode when the ATM is disconnected from the primary power source, and a backup battery mode when the ATM is disconnected from the primary power source and the network. Such alternative modes may allow the ATM to function despite being disconnected from the primary power source and/or the network. Other alternative modes (e.g., one or more power saving modes) are also contemplated herein, as described further below, to manage power consumption or other ATM functionality while the ATM is disconnected from the primary power source and/or the network.

In the backup mode, for example, the ATM is offline and, thus, configured to utilize customer data that is locally stored in a secure memory device of the ATM to authorize requests for currency instead of utilizing data received from the network. Notably, during storing of the customer data in the secure memory device of the ATM, the customer data may be securely encoded in a specialized data format and encrypted in the secure memory device of the ATM to inhibit the unauthorized copy or use of the customer data by others. Thus, the backup mode allows the ATM to receive, authorize, and complete requests for currency during network outages by virtue of relying on the customer data stored in the secure memory device of the ATM to authorize transactions.

Additionally, in the battery mode, for example, a battery is configured to electrically power one or more ATM components, such as ATM components that receive, authorize, and/or complete requests for currency. The battery may, in some aspects, be a rechargeable battery that is configured to electrically power one or more input components (e.g., keypad, touchscreen, magnetic stripe reader, chip reader, and/or the like) of the ATM, one or more output components (e.g., a display device, a speaker, a printer, and/or the like) of the ATM, one or more transaction authorization components (e.g., one or more processors, the secure memory device, and/or the like) of the ATM, or one or more other ATM components as described herein. The battery mode allows the ATM to receive, authorize, and complete requests for currency during power outages.

Furthermore, when in the backup battery mode, the battery is configured to electrically power one or more ATM components and, by virtue of being offline, the ATM is further configured to utilize the customer data stored in the secure memory device of the ATM to authorize transactions rather than utilizing data received from the network. Notably, the provider's existing customers, or a subset thereof, may have their respective customer data stored in the secure memory device of the ATM, which enables these customers to withdraw currency from the ATM, despite the combined power and network outages. The backup battery mode allows the ATM to receive, authorize, and complete requests for currency from customers having their data stored in the secure memory device of the ATM even when there is both network and power outages.

In some implementations, the amount of currency that a customer can withdraw based on a given request for currency received at the ATM may be limited to a certain predefined value or amount of currency. For example, in some implementations, the amount of currency that a customer can withdraw based on a given request for currency received at the ATM may be less than or equal to a predefined threshold amount of currency or less than or equal to a dynamically calculated amount, which may be based on the total amount of currency available for dispensing by the ATM. The ability to manage the amount of currency being dispensed to customers during network and/or power outages preserves and/or rations the amount of currency should the outages last for a prolonged period of time.

In this way, some implementations described herein enable the ATM to function and operate regarding receiving, authorizing, and completing requests for currency without being connected to the network, and/or without being connected to the primary power source. Such functionality, therefore, obviates the need to manage and deploy large amounts of currency reserves, as some amount of currency is likely to be available and on hand to dispense to customers even when the ATM is offline. Additionally, in some implementations described herein, the ATM is operable to receive, authorize, and complete requests for currency using the customer data that is encoded, encrypted, and stored in the secure memory device of the ATM, which can prevent hackers or unauthorized users from accessing the customer data.

Furthermore, some implementations described herein enable secure transactions to take place at the ATM and records thereof to be retained, even during network and/or power outages, by virtue of the transaction authorization components of the ATM generating, encoding, encrypting, and/or storing transaction data associated with each authorized and completed request for currency that occurs at the ATM while the ATM is disconnected from the primary power source and/or the network. Such transaction data may be stored in the secure memory device of the ATM and retained after a request for currency is authorized and completed for use in resolving account balances and accurately posting the withdrawal from customers' accounts upon restoring the network connection and/or the connection to the primary power source. In this way, the ATMs set forth herein can continue to provide meaningful functionality even when offline or in the wake of a natural disaster, thereby improving operations of the ATMs.

Figure 1B:
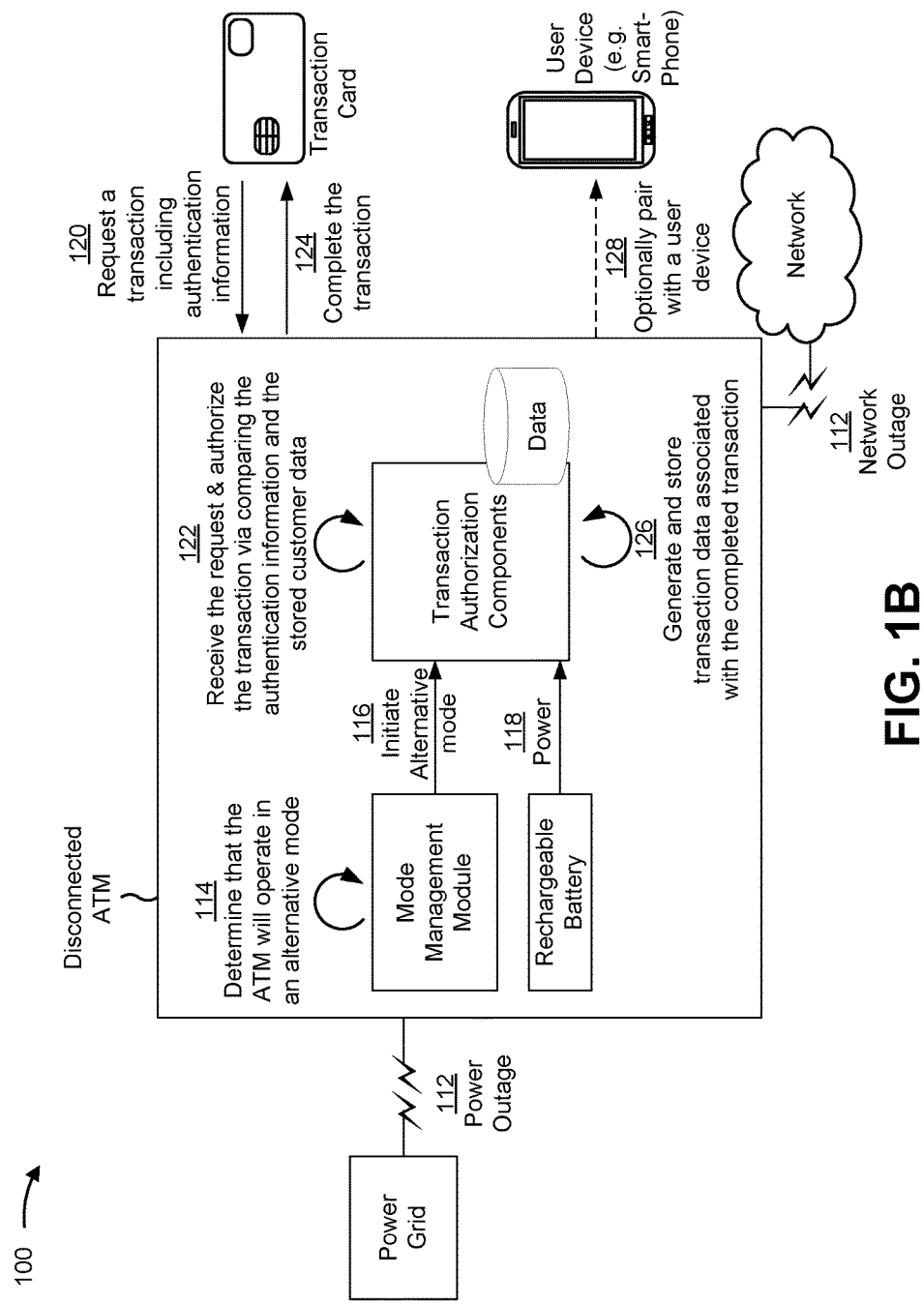
Figure 1C:
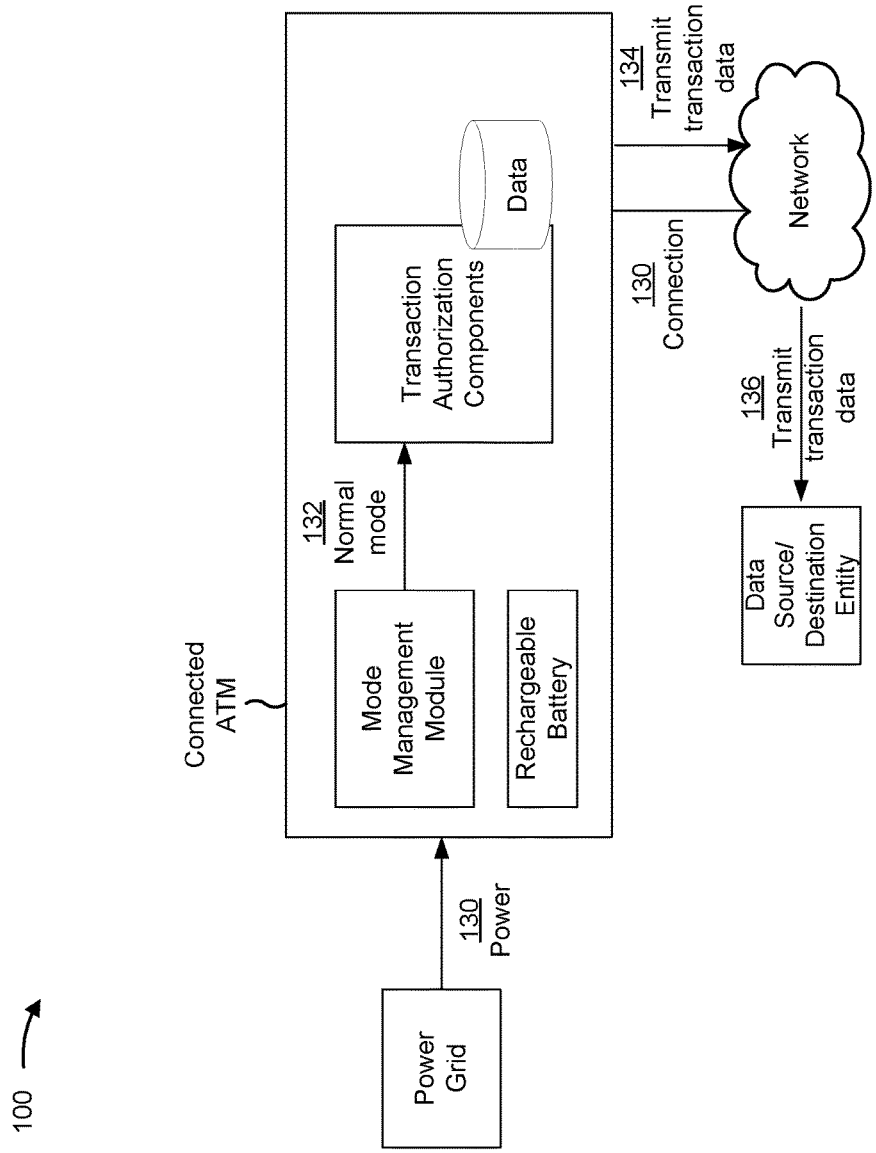

FIGS. 1A-1C are diagrams of an overview of an example implementation 100 described herein. As shown in FIGS. 1A-1C, example implementation 100 may include an ATM owned or operated by a provider, a power grid serving as a primary power source for the ATM, a network, and a data source/destination entity. The data source/destination entity may be the provider of the ATM, for example, and may be a banking entity, an issuing bank entity, an authorizing banking entity, and/or the like. The data source/destination entity, in some implementations, is configured to send data to and/or receive data from the ATM when the ATM is connected to the network. The ATM may include a mode management module, a battery, transaction authorization components, and a secure memory device configured to store data, including customer data received from the data source/transaction entity and/or transaction data to be transmitted to the data source/transaction entity, as described further below. The customer data and the transaction data may be encoded according to a specialized data format written and/or recognized by the provider of the ATM, encrypted, and stored locally in the secure memory device of the ATM.

FIG. 1A depicts a connected ATM. The connected ATM includes an ATM that is connected to the network by which the ATM can send and receive data during normal operation of the ATM, thereby allowing the ATM to authorize and conduct various transactions using data received from the network. The ATM, in the connected state, may also be connected to the primary power source and receive power, although the connection to the primary power source is optional. In general, the connected ATM may be online and, thus, can send and receive data from the network to authorize and conduct transactions, namely transactions for withdrawals of currency.

As shown in FIG. 1A, and by reference number 102, the connected ATM may optionally receive power from the primary power source. As shown by reference number 104, the mode management module of the ATM may determine that the ATM is connected to the primary power source and has network functionality by virtue of being connected to the network. Based on this determination, the mode management module may instruct one or more ATM components, such as the transaction authorization components, to function normally according to a normal mode. In some implementations, the normal mode may include a mode in which the ATM functions normally to authorize transactions for customers and non-customers alike using data or information communicated by the network. Similarly, in the normal mode, electrical power from the primary power source may be routed to the transaction authorization components for use in authorizing transactions according to data received from the network. Additionally, the normal mode may include a mode in which the ATM can perform other normal functionality, including facilitating monetary transfers between customer accounts, deposits of currency, assessments of real time balances, and/or the like. In some implementations, during the normal mode, the battery may also receive energy from the primary power source and store the energy by virtue of being connected to the primary power source. Additionally, or alternatively, in some implementations, the battery may receive and store energy from an alternative power source, such as one or more solar panels, generators, wind turbines, and/or the like.

As further shown in FIG. 1A, and by reference number 106, when in the normal mode, the data source/destination entity can send customer data to be stored in the secure memory device of the ATM, so that the customer data may be used as backup data to authorize requests for currency by the ATM in instances where the ATM loses connection to the network and/or primary power source. For example, as shown by reference number 108, the customer data transmitted by the data source/destination entity can be forwarded to the ATM via the network. As shown by reference number 110, while in the normal mode, the ATM can receive and store the customer data for use as backup data by the ATM should the ATM become disconnected from the network. The customer data received and stored in the secure memory device of the ATM may be periodically populated, replaced, and/or updated, for example, according to an hourly, daily, weekly, etc., schedule, on demand, based on a trigger such as an occurrence of or a prediction of an occurrence of an event (e.g., a weather event), when requested by the ATM, and/or the like.

Further, and in some implementations, the customer data stored in the secure memory device of the ATM may be encoded and encrypted in the secure memory device so as to prevent the unauthorized access of such customer data. For example, the ATM may encode the customer data in a specialized format recognized by the provider and encrypt the customer data by performing a symmetric-key encryption (e.g., Advanced Encryption Standard (AES), Triple DES (3DES), Rivest Cipher 4 (RC4), Twofish, Serpent, Skipjack, etc.), an asymmetric-key encryption (e.g., Rivest-Shamir-Adleman (RSA), Digital Signature Algorithm (DSA), elliptic-curve cryptography (ECC), elliptic curve digital signature algorithm (ECDSA), hashing, etc.), and/or the like.

In some implementations, the customer data received from the data source/destination entity and stored in the secure memory device of the ATM may include one or more customer identifiers, such as a unique customer identifier (e.g., a randomly generated customer identifier or a unique identifier based on unique customer profile information), a customer name, a customer account identifier, a customer's transaction card information (e.g., a transaction card identifier, expiration date, etc.), a customer's personal identification number (PIN), a customer's address and/or zip code, a customer's phone number, or any other information that may be helpful to identify and confirm that the request for currency is being made by one of the provider's customers when receiving, authorizing, and completing the request for currency in instances where the ATM fails to access the network. For example, the customer data may include biometric information associated with the customer, which may include any biological trait that identifies the customer, such as a fingerprint, hand geometry, retina or iris pattern, voice signature, facial pattern, and/or the like.

In some implementations, the customer data being stored in the secure memory device of the ATM may optionally include one or more customer account attributes. Example customer account attributes may include an indication of a customer account status (e.g., whether the account is in good standing, whether the account is overdrawn, whether the account is associated with a particular tier of accounts (e.g., bronze, gold, platinum, etc.), etc.), an indication of whether the customer account balance satisfies a minimum account balance threshold, an indication of whether the customer account is associated with a customer having a credit limit that meets or exceeds a minimum credit limit, an indication of whether the customer account is associated with a customer having a credit score that meets or exceeds a minimum credit score, and/or the like. In such cases, the transaction authorization components of the ATM may analyze the customer account attributes to further assist in authorizing or denying requests for currency and/or limiting the amount of currency that a customer may withdraw from the ATM. Authorizing requests for currency based on customer account attributes may prevent or minimize the number of account overdrafts and/or fees incurred during network and/or power outages.

In some implementations, customer data for all of the provider's customers (e.g., thousands, millions, etc. of records) may be stored in the secure memory device of the ATM. Storing all of the provider's customer data in the secure memory device of the ATM may allow more customers to be served in the event of the network and/or power outage. In some implementations, customer data for a subset of the provider's customers may be stored in the secure memory device of the ATM. The subset of customer data being stored in the secure memory device of the ATM may be based on the customer's address, the customer's real-time geographic location or region, the customer's preferences, the customer's use of the ATM, the tier of the customer's account, the customer's purchasing history. Storing the subset of the provider's customer data in the secure memory device of the ATM conserves memory resources and maximizes use of memory available in the secure memory device, thus, increasing assurances that there is likely to be adequate memory available for storing transaction data associated with authorized and completed requests for currency. Further, storing just a subset of the provider's customer data when connected to the network would require fewer resources and decrease network usage.

In some implementations, the subset of customer data stored in the secure memory device of the ATM may identify customers having a home or office mailing address within a given proximity (e.g., as measured via distance, time, etc.) of the ATM. This may allow customers to access currency from one or more ATMs that are located close to their home or office in the event of a network outage or emergency. Similarly, the subset of customer data stored in the secure memory device of the ATM may identify customers having a real-time location within a given proximity (e.g., as measured via distance, time, etc.) of the ATM. This allows customers who may be traveling away from home to access currency from one or more ATMs located close to their current location in the event of a network outage or emergency. In some implementations, the subset of customer data stored in the secure memory device of the ATM may identify customers having a last known address or location within the given proximity of the ATM. For example, customers having a last known address within the last 4, 8, 12, 24, 48-hours, and/or the like may have customer data stored in the secure memory device of the ATM. This may be useful in situations where a real-time location of a customer cannot be determined (e.g., during network outages).

Further, in some implementations, customers may set preferences and/or opt-in to having their customer data stored in the secure memory device of one or more ATMs. This allows customers to decide whether to have their data stored in the secure memory device of the one or more ATMs and enable customers to choose which ATMs may store their data. Allowing customers to choose one or more ATMs at which to store their customer data and/or allowing customers to opt-in to the storage of their customer data may alleviate concerns over misappropriation or hacking of the customer data. In some implementations, the subset of customer data stored in the secure memory device of the ATM may identify customers having a history of using the ATM and/or making purchases within a given proximity of the ATM. This allows customers to access currency from one or more ATMs located within their frequent or preferred shopping area in the event of a network outage or emergency.

In some implementations, the customer data stored in the secure memory device of the ATM may identify customers having a predetermined customer account tier level. For example, customers may be ranked according to a customer account tier level scheme (e.g., gold, silver bronze, etc.). In some implementations, the subset of customer data stored in the secure memory device of the ATM may identify customers having a higher customer account tier level than other customer's levels, to withdraw a larger amount of currency compared to customers having lower customer account tier levels, and/or the like.

FIG. 1B depicts a disconnected ATM. A disconnected ATM may include an ATM that lacks the network connection (or lacks a sufficient network connection). The disconnected ATM may optionally be disconnected from the primary power source. As shown in FIG. 1B, and by reference number 112, the disconnected ATM may experience the network outage and, optionally, the power outage. As shown by reference number 114, the mode management module may detect such disruption(s), outage(s) and/or the disconnection from the network and selectively implement an alternative mode of operation. For example, the mode management module may determine the network outage via detecting a loss in the ability to access the network, to send and/or receive data, and/or the like. The mode management module may determine the power outage via detecting a lack of power being received from the primary power source. In this case, the mode management module may determine that the ATM will operate in the alternative mode, and may activate and implement the alternative mode.

In some implementations, as described herein, the alternative mode implemented by the mode management module may include a backup mode (i.e., in a case where the ATM is only disconnected from the network), a battery mode (i.e., in a case where the ATM is only disconnected from the primary power source), a backup battery mode (i.e., in a case where the ATM is disconnected from both the primary power source and the network), a power saving mode, or any other mode as described herein.

In some implementations, when in the backup mode, the transaction authorization components of the ATM receive, authorize, and/or complete requests for currency using the customer data stored in the secure memory device of the ATM instead of data communicated by the network. In some implementations, when in the battery mode, for example, the mode management module of the ATM routes power from the battery to the transaction authorization components of the ATM so that the requests for currency can be received, authorized, and/or completed. In some implementations, when in the backup battery mode, the mode management module of the ATM routes power from the battery to the transaction authorization components of the ATM and the transaction authorization components of the ATM receive, authorize, and/or complete requests for currency using the customer data stored in the secure memory device of the ATM instead of data communicated by the network. In some implementations, when in the power saving mode, the mode management module of the ATM can instruct one or more ATM components of the ATM to go into deep sleep mode to conserve battery power and wake from the deep sleep mode based on, for example, detecting the customer's presence near the ATM (e.g., using a sensor that may be the only active component during the deep sleep), the customer pressing a button on the ATM keypad, the customer inserting a transaction card into the ATM, the customer causing the transaction card or a user device to communicate with the ATM, the customer touching the display screen of the ATM, and/or the like.

As further shown in FIG. 1B, and by reference number 116, the mode management module may initiate the alternative mode based on determining that the ATM lacks a network connection and/or is disconnected from the primary power source. Initiating the alternative mode may include instructing the transaction authorization components of the ATM to receive, authorize, and/or complete requests for currency based on the customer data stored in the secure memory device of the ATM. In some implementations, initiating the alternative mode allows the transaction authorization components of the ATM to receive, authorize, and/or complete requests for currency despite being disconnected from the network.

In some implementations, as shown by reference number 118, initiating the alternative mode may also, or alternatively, include routing power from the battery to various ATM components, including the transaction authorization components of the ATM, so that the transaction authorization components can receive, authorize, and/or complete requests for currency despite being disconnected from the primary power source.

As shown by reference number 120, a transaction card or a user device may be used to request a transaction. In some implementations, the request is a request for currency. The request may include authentication information associated with a user making the request. In some implementations, the authentication information received in the request may include any information needed to authorize and/or complete the request. For example, in some implementations, the authentication information includes a customer identifier (e.g., a unique identifier, a customer name, biometric data, etc.), transaction card information (e.g., a transaction card number, chip information, a PIN Number, etc.), and/or any other information as described herein.

Still referring to FIG. 1B, and in some implementations, as shown by reference number 122, the transaction authorization components of the ATM may receive the request and the transaction authorization components of the ATM may authorize the transaction via comparing the authentication information (i.e., received from the transaction card and/or the user) and the customer data that is stored in the secure memory device of the ATM. For example, the transaction authorization components of the ATM may initially compare the authentication information and the customer data stored in the secure memory device of the ATM to determine whether the user is a customer and, if the user is a customer, then the transaction authorization components of the ATM may authorize and complete the request. The authentication information may be received in the request or received separately from the request. For example, in some implementations, the authentication information is received separately from the request in the form of biometric data, the user entering a PIN, the user entering a multi-factor authentication code, and/or the like.

In some implementations, the transaction authorization components of the ATM may compare the authentication information and the customer data by performing a lookup in a data table, by employing an algorithm, or by performing any other operation by which the authentication information and the customer data stored in the secure memory device of the ATM may be correlated and/or matched. In this way, the transaction authorization components of the ATM can verify that the request is being received from one of the provider's customers and determine whether the request can or cannot be authorized. Notably, the transaction authorization components are not required to access data from the network to receive, authorize, and/or complete requests, thus, allowing the ATM to maintain functionality despite being disconnected from the network and/or the primary power source.

In some implementations, the request may be automatically authorized merely by virtue of the transaction authorization components verifying that the customer has customer data stored in the secure memory device of the ATM based on comparing the customer data and the authentication information received in the request. In some implementations, the request may be authorized upon the transaction authorization components of the ATM verifying whether the customer data satisfies one or more conditions using the customer account attributes noted above.

For example, in some implementations, the customer data being stored in the secure memory device of the ATM may include one or more customer account attributes. Example customer account attributes may include an indication of a customer account status, an indication of whether the customer account balance satisfies a minimum account balance threshold, an indication of whether the customer account is associated with a customer having a credit limit that meets or exceeds a minimum credit limit, an indication of whether the customer account is associated with a customer having a credit score that meets or exceeds a minimum credit score, an indication of a customer account tier level, and/or the like. In such cases, the transaction authorization components of the ATM may analyze or assess the customer account attributes to further assist in authorizing or denying the request and/or limiting (or expanding) the amount of currency that a customer may withdraw from the ATM. Authorizing requests based on customer account attributes may prevent or minimize the number of account overdrafts and/or fees incurred during network and/or power outages.

In some implementations, the customer account attributes may identify or flag the customer accounts that are overdrawn so that requests from the flagged accounts may be denied and not authorized by the transaction authorization components of the ATM. Similarly, the customer account attributes may identify or flag customer accounts that are in good standing so that requests from the flagged accounts may be authorized by the transaction authorization components of the ATM. Authorizing requests based on whether the account is in good standing may further prevent or minimize the number of account overdrafts incurred during network and/or power outages.

In some implementations, the customer account attributes may identify or flag the customer accounts that satisfy the minimum account balance threshold so that requests from the flagged accounts may be authorized by the transaction authorization components of the ATM. For example, the request may be authorized where the customer account satisfies the minimum account balance threshold. The threshold may be set to any predefined value or limit, for example, such as fifty dollars, one hundred dollars, or more than one hundred dollars. Alternatively, the customer account attributes may identify or flag the customer accounts that do not satisfy the minimum account balance threshold so that requests from the flagged accounts may be denied and not authorized by the transaction authorization components of the ATM. Authorizing requests based on such customer account attributes that are indicative of whether the customer account balance satisfies the minimum account balance threshold may further reduce the amount of fees experienced during the network and/or power outage, as customers lack the ability to verify real-time account balances during such outages.

In some implementations, the customer account attributes may identify or flag the customer accounts that are associated with customers having credit limits that meet or exceed the minimum credit limit. For example, the request may be authorized where the customer account is associated with customers having credit limits that meet or exceed the minimum credit limit. The minimum credit limit may be set to any predefined value or limit, for example, such as one hundred dollars, five hundred dollars, one thousand dollars, more than one thousand dollars, and/or the like. Alternatively, the customer account attributes may identify or flag the customer accounts that are associated with customers having credit limits that are less than and/or fail to meet or exceed the minimum credit limit so that requests from the flagged accounts may be denied and not authorized by the transaction authorization components of the ATM. Authorizing requests based on such customer account attributes that are indicative of whether the customer accounts are associated with customers having credit limits that meet or exceed the minimum credit limit may increase the number of customers to be served during the network and/or power outages, while also providing some assurance that the allowed requests are likely to be paid back should the accounts be overdrawn as a result of authorizing and completing the requests.

In some implementations, the customer account attributes may identify or flag the customer accounts that are associated with customers having credit scores that meet or exceed or fail to meet or exceed the minimum credit score. Authorizing requests based on indications of the customer's credit score may further increase the number of customers to be served during the network and/or power outages, while also providing some assurance that the allowed requests are likely to be paid back should the accounts be overdrawn as a result of authorizing and completing the requests.

In some implementations, the customer account attributes may indicate the customer account tier level. For example, the customer account attributes may identify whether a customer has a higher customer account tier level (e.g., gold), an intermediate customer account tier level (e.g., silver), or a lower customer account tier level (e.g., bronze). The customer account attributes may rank the customer accounts according to different customer account levels or identify or flag the customer accounts that are associated with specific customer account tier levels so that requests from the flagged accounts may be denied for customers having lower customer account tier levels and/or authorized for customers having higher customer account tier levels.

As further shown in FIG. 1B, and by reference number 124, the requested transaction may be completed whereby currency may be dispensed. In some implementations, the ATM may refrain from dispensing the full amount of currency being requested and may limit and/or manage the amount of currency being dispensed by dispensing a predefined amount according to predefined instructions implemented by the transaction authorization components of the ATM upon initiation of the alternative mode. Additionally, or alternatively, the ATM may limit and/or manage the amount of currency being dispensed to a maximum amount based on the total amount of currency available for dispensing by the ATM. The maximum amount may be dynamically calculated or derived by the transaction authorization components of the ATM, for example, based on an algorithm or calculation that takes into account the total amount of currency available for dispensing by the ATM. In some implementations, transaction authorization components of the ATM may limit the amount of currency to be dispensed to a predefined percentage based on the total amount of currency available for dispensing by the ATM. Limiting the amount of currency available for withdrawal may alleviate the provider and/or customer concerns regarding overdrafts and/or excessive fees that may be incurred while the ATM is offline.

In some implementations, in limiting and/or managing the amount of currency being dispensed by the ATM, the transaction authorization components of the ATM may take into account an expected number of transactions that the ATM may be expected to incur based on the day of the week, the time, and/or the number of customers in a given geographic location. For example, the transaction authorization components of the ATM may limit the amount of currency being dispensed to the maximum amount based on predefined instructions or a set of predefined rules to limit the amount of currency available for withdrawal to the maximum amount during days or times at which the ATM is expected to incur a high volume of requests. Similarly, the transaction authorization components of the ATM may limit the amount of currency being dispensed to the maximum amount based on predefined instructions or a set of predefined rules to limit the amount of currency available for withdrawal to the maximum amount in densely populated geographic locations. The maximum amount may be any predefined or calculated amount, for example, and may be twenty dollars or more, fifty dollars or more, one hundred dollars or more, and/or the like. In some implementations, the ATM may implement a type of currency management by executing passive rules or dynamic currency management solutions to prevent customers from withdrawing a large amount of currency that may otherwise prevent additional customers from accessing currency.

As further shown in FIG. 1B, and by reference number 126, the transaction authorization components of the ATM may generate and store transaction data associated with the completed transaction in the secure memory device of the ATM. Transaction data may include, for example, information regarding the customer and/or the customer account from which the request is made, the amount of currency withdrawn or dispensed from the customer account by the ATM, and/or timestamp information associated with what day and/or time the request was authorized or completed by the ATM. In some implementations, the transaction authorization components of the ATM may also generate and store a transaction identifier associated with the completed transaction in the secure memory device of the ATM. Such transaction identifiers may be used to link the transaction data stored in the secure memory device of the ATM and the customer data stored in the secure memory device of the ATM. In some implementations, the transaction identifier may be generated prior to storing the transaction data in the secure memory device of the ATM.

In some implementations, the transaction data stored in the secure memory device of the ATM may include any information associated with the authorized and completed request. For example, the transaction data stored in the secure memory device of the ATM may include timestamp information. In some implementations, the timestamp information may be used to ensure that only one request per customer per a predetermined time period is being received, authorized, and/or completed by the transaction authorization components of the ATM. In this way, the transaction authorization components of the ATM may prevent overdrafts, minimize fees, assist with currency management, and/or the like. For example, the transaction authorization components of the ATM may utilize the timestamp information stored in the secure memory device of the ATM to ensure authorization of only one customer request per the predetermined time period of every 8-hours, every 12-hours, every 24 hours, or greater than or equal to approximately 24-hours. Upon generating and storing the transaction data while the ATM is disconnected, the transaction authorization components of the ATM can thereafter transmit the transaction data to the data source/destination entity when the network connection is restored and/or when the ATM becomes connected to the primary power source. In this way, records regarding requests can be maintained in the secure memory device of the ATM and transmitted to the data source/destination entity so that customer accounts may be accurately reconciled when the ATM is restored to a connected or online state. Further, the transaction data stored in the secure memory device of the ATM may be paired with a stored account balance for determining, after the predetermined time period, if the customer still meets the criteria for being able to withdraw currency again.

As further shown in FIG. 1B, and by reference number 128, the ATM may, in some implementations, pair with a user device (e.g., a smartphone, a computer, wearable computing device, etc.) to further assist with currency management. For example, the ATM may pair with the user device using a near field communication (NFC) tag or Bluetooth connectivity to establish a communication channel between the ATM and the user device prior to authorizing the request so that only a single request including the customer's authentication information may be authorized during the predetermined time period as described above. In a case where the user device is a smartphone or other device capable of pairing with the ATM, an application on the user device may optionally be utilized to record the transaction and prevent a user from going to a second ATM to withdraw currency after withdrawing currency from a first ATM.

Further in this regard, in some implementations, multiple discrete ATMs may communicate with each other via pairing to prevent a user from withdrawing cash from more than one ATM within the predetermined time period in order to conserve and/or ration the amount of currency being dispensed to a population of customers in a given geographic area after a network outage, a power outage, or both.

FIG. 1C depicts a connected ATM for which connections to the primary power source and/or the network have been restored. As shown by reference numbers 130, the ATM connections to the primary power source and/or the network, depending on whether only one or both were lacking, are restored. As shown by reference number 132, the mode management module of the ATM may instruct the transaction authorization components of the ATM to resume the normal mode upon restoration of the power and/or network connections. As shown by reference number 134, the transaction authorization components of the ATM may transmit transaction data associated with transactions conducted while the ATM was offline. As shown by reference number 136, the data source/destination entity may receive the transaction data transmitted by the ATM. In this way, the ATM enables banking records to be reconciled and debits to accurately post to the customer accounts upon restoration of the network connection.

The implementations set forth herein allow ATMs to maintain functionality even during power and/or network outages. Thus, the need for manpower or resources that would otherwise be required for devotion to restoring offline ATMs during network outages, emergency situations, or situations resulting from a natural disaster, may be obviated.

As indicated above, FIGS. 1A-1C are provided merely as an example. Other examples are possible and may differ from what was described with regard to FIGS. 1A-1C.

Figure 2:
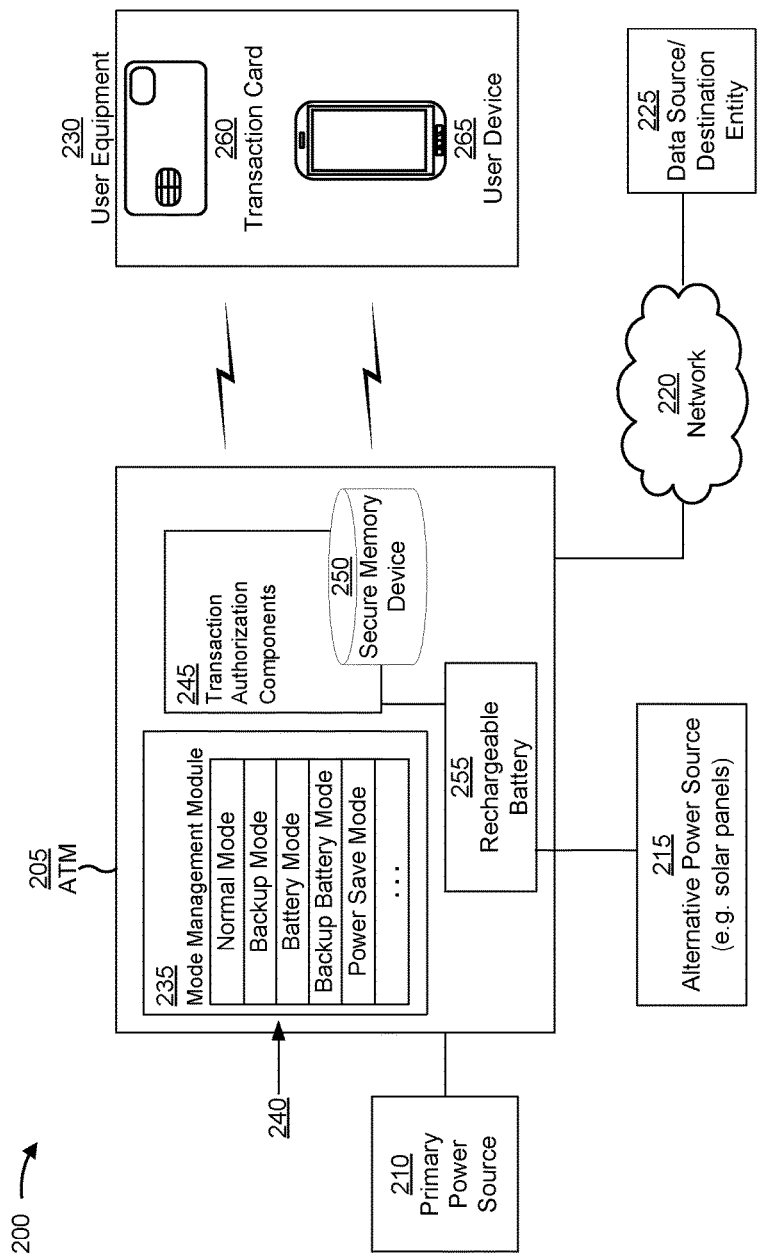
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ATM 205, a primary power source 210, an alternative power source 215, a network 220, a data source/destination entity 225, and user equipment 230. As shown, ATM 205 may include a mode management module 235, a plurality of modes 240 from which the ATM may choose to selectively implement, transaction authorization components 245, a secure memory device 250 for storing customer data and transaction data, and a battery 255. As further shown, user equipment 230 may include a transaction card 260 and/or a user device 265. Devices of environment 200 may interconnect via wired connections, wireless connections, or a combination of wired and wireless connections.

ATM 205 includes one or more devices capable of communicating with user equipment 230 to receive, authorize, and complete a request, namely a request for currency. For example, ATM 205 may include an ATM terminal having a card reader (e.g., a magnetic stripe card reader, a chip card reader, and/or the like), a contact transaction interface, and/or the like. ATM 205 may include one or more input components and/or output components to facilitate receiving and/or transmitting data to and/or from ATM 205. Example input components of ATM 205 may include a number keypad, a touchscreen, a magnetic stripe reader, a chip reader, a camera, a scanner (e.g., a barcode scanner, QR code scanner, and/or the like), a radio frequency (RF) signal reader, and/or the like. Example output components of ATM 205 may include a display device, a speaker, a printer, and/or the like. ATM 205 may also include a currency output component configured to dispense currency based on a result of authorizing the request.

In some implementations, transaction authorization components 245 of ATM 205 may receive authentication information from transaction card 260 or user device 265 (and/or a user of transaction card 260 or user device 265) and authorize or deny the request by comparing the authentication information and customer data stored in secure memory device 250 of ATM 205. Where the request is authorized, ATM 205 may complete the request upon dispensing currency.

In some implementations, ATM 205 includes one or more devices capable of performing various types of financial transactions, such as a currency withdrawal, a money deposit (e.g., a check or cash deposit), a money transfer (e.g., a transfer from one bank account to another bank account), access to information related to an account (e.g., a bank account, a checking account, a credit account, etc.), and/or the like. For example, ATM 205 may include an ATM, an automated banking machine (ABM), a cash point, a Cashline®, a Minibank®, a cash machine, a Tyme® machine, a cash dispenser, a Bankomat®, a Bancomat®, and/or a similar type of device.

Primary power source 210 includes a main alternating current (AC) power supply that is capable of supplying power to ATM 205. Primary power source 210 may include or receive power from an electrical grid that may include one or more power stations, power transmission networks, substations, and/or the like. Primary power source 210 is configured to charge battery 255 during normal operation so that battery 255 may be used to route power to one or more ATM components as needed, for example, during a power outage.

Alternative power source 215 includes a power supply that is capable of either enhancing power received from primary power source 210 or completely bypassing primary power source 210 and supplying power to battery 255 and/or ATM 205. Alternative power source 215 may include one or more generators, solar panels, wind turbines, and/or the like. Alternative power source 215 may further charge battery 255 as energy is depleted therefrom.

Network 220 includes one or more wired and/or wireless networks. For example, network 220 may include a communications network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Data source/destination entity 225 includes an entity that is capable of sending data to and/or receiving data from ATM 205 via network 220. In some implementation, data source/destination entity 225 is a provider of ATM 205 or a banking entity. Data source/destination entity 225 may send and/or receive data used to authorize and/or memorialize transactions made during a normal mode, customer data to be stored in the secure memory device of ATM 205 for use during an alternative mode, and/or transaction data associated with transactions completed while ATM 205 is in the alternative mode. In some aspects, data source/destination entity 225 may include an issuing bank entity or an authorizing banking entity. As particular examples, a data source/destination entity 225 may include a transaction backend device, a server device, a data center, and/or the like.

User equipment 230 includes one or more devices capable of interacting (e.g., via pairing, NFC, magnetic strip interaction, chip interactions, and/or the like) with ATM 205 for sending, receiving, generating and/or storing authentication information for authorizing and/or completing requests. User equipment 230, in some aspects, includes a transaction card 260 and/or a user device 265 as further described herein.

Mode management module 235 includes one or more devices capable of determining or detecting an outage in regards to and/or disconnection from the primary power source 210, the network 220, or both. Mode management module 235 may detect an outage or disconnection from the primary power source 210 via detecting a loss in routing of power from primary power source 210. Mode management module 235 may detect an outage or disconnection from network 220 via detecting a loss in the ability to send or receive data. Mode management module 235 is further configured to select and implement modes 240, which may include the normal mode and the one or more alternative modes.

In some aspects, mode management module 235 may include a switch, a gate, a transistor, a controller, a processor (e.g., a processor described below in connection with FIG. 3), a memory (e.g., a memory described in connection with FIG. 3), a programmable logic device (e.g., a complex programmable logic device (CPLD), a field-programmable gate array (FPGA), an embedded FPGA (eFPGA), and/or the like), an application-specific integrated circuit (ASIC), and/or the like. In some implementations, mode management module 235 may include one or more diodes (e.g., an ideal diode), one or more switches (e.g., a load switch), and/or the like to control signals between power reception components and one or more components of ATM 205 (e.g., transaction authorization components 245 of ATM 205) to ensure functionality of these components during a power or network outage. In some implementations, mode management module 235 may include one or more processors for performing one or more processes described herein. As particular examples, mode management module 235 may include a computing device or platform of ATM 205, and may include memory and one or processors for implementing modes 240.

In some implementations, mode management module 235 may initiate or implement the one or more modes 240. For example, modes 240 may include the normal mode in which ATM 205 functions normally and authorizes requests for currency using data obtained from the network 220. As another example, modes 240 may further include a backup mode in which ATM 205 authorizes transactions using customer data stored in secure memory device 250 of ATM 205 and stores transaction data in secure memory device 250 of ATM 205 for subsequent transmission once the network connection is restored. As another example, modes 240 may include a battery mode in which ATM 205 functions via switching to battery power for powering transaction authorization components 245 of ATM 205. As a further example, modes 240 may include a backup battery mode in which ATM 205 authorizes transactions using the customer data stored in secure memory device 250 and also switches to battery power for powering transaction authorization components 245 of ATM 205. In some implementations, modes 240 include a power saving mode by which ATM 205 enters a deep sleep during periods of inactivity to conserve power. In some implementations, modes 240 may include any other mode necessary to receive, authorize, and complete ATM transactions.

Transaction authorization components 245 include one or more devices capable of accessing customer data from secure memory device 250 and authorizing or denying requests for currency based on comparing the customer data to authentication information received from user equipment 230. Transaction authorization components 245 are further capable of generating and storing transaction data associated with completed transactions that occur when ATM 205 is offline. In some implementations, transaction authorization components 245 may include secure memory device 250 and one or more processors for performing one or more processes described herein. Transaction authorization components 245 may further include a switch, a gate, a transistor, a controller, a processor (e.g., a processor described below in connection with FIG. 3), a memory, a programmable logic device (e.g., a complex programmable logic device (CPLD), a field-programmable gate array (FPGA), an embedded FPGA (eFPGA), and/or the like), an application-specific integrated circuit (ASIC), and/or the like.

Secure memory device 250 may include one or more devices capable of securely storing information, such as the customer data and transaction data described above. In some implementations, secure memory device 250 is local to ATM 205. In some implementations, secure memory device 250 may include a universal integrated circuit card (UICC), a secure digital (SD) card (e.g., a microSD card and/or the like), an embedded secure element, and/or the like. In some implementations, secure memory device 250 may include a tamper resistant hardware platform. In some implementations, secure memory device 250 may host a personalized card application and a cryptographic key required to authorize a transaction. Additionally, or alternatively, secure memory device 250 may host a payment application or operating system (OS), such as JavaCard OS and/or the like. In some implementations, secure memory device 250 may store customer data, such as financial information (e.g., a card number, an account number, an expiration date, and/or the like), a credential (e.g., a username, a password, biometric information, a token, a certificate for signing documents, a user identifier, and/or the like), cryptographic information, account information, and/or the like. Secure memory device 250 may store customer data for authorizing request and/or transaction data for later transmittal to a remote entity, such as data source/destination entity 225. In some implementations, secure memory device 250 may further include one or more processors for performing one or more processes described herein.

Battery 255 includes a device for storing energy and powering one or more components of ATM 205, including transaction authorization components 245. As the energy is depleted from battery 255, battery 255 may recharge via storing energy received from primary power source 210 or alternative power source 215. Battery 255 can be located or disposed inside ATM 205 or separate, perhaps even remote from ATM 205, in some implementations. Battery 255 may enhance power received from primary power source 210 or completely bypass primary power source 210, in some implementations. As an example, battery 255 may include a lithium based battery or a battery pack.

Transaction card 260 includes one or more devices capable of interacting with ATM 205 for sending, receiving, generating, storing, processing, and/or providing authentication information for requests as described above. For example, transaction card 260 may include a smart card, credit card, a debit card, a prepaid card having a predefined account balance, a payment card, an ATM card, a stored-value card, a fleet card, a transit card, an access card, a virtual card implemented on user device 265, and/or the like.

Transaction card 260 may be capable of storing and/or communicating data for a point-of-sale (PoS) transaction with ATM 205. For example, transaction card 260 may store and/or communicate transaction data, including account information (e.g., an account identifier, a cardholder identifier, etc.), expiration information of transaction card 260 (e.g., information identifying an expiration month and/or year of transaction card 260), banking information (e.g., a routing number of a bank, a bank identifier, etc.), transaction information (e.g., a payment token), and/or the like as described above. For example, to store and/or communicate the data, transaction card 260 may include a magnetic strip and/or an integrated circuit (IC) chip (e.g., a EUROPAY®, MASTERCARD®, VISA® (EMV) chip).

In some implementations, transaction card 260 may further include an antenna to communicate data associated with transaction card 260. The antenna may be a passive RF antenna, an active RF antenna, and/or a battery-assisted RF antenna. In some implementations, transaction card 260 may be a smart transaction card, capable of communicating wirelessly (e.g., via Bluetooth, Bluetooth Low Energy (BLE), NFC, and/or the like) with a computing device, such as ATM 205, user device 265, a digital wallet, and/or another device. In some implementations, transaction card 260 may communicate with ATM 205 to request currency (e.g., based on being moved within communicative proximity of a transaction terminal of ATM 205), as described herein.

User device 265 may include one or more devices capable of interacting (e.g., via pairing, NFC, Bluetooth connectivity or the like) with ATM 205 for sending, receiving, generating, pairing, and/or storing customer data, authentication information, and/or transaction data associated with aspects of authorizing and/or completing requests as described herein. In some aspects, user device 265 may include a mobile device (e.g., a tablet computer, a laptop computer, a smart wallet device, a phone, such as a mobile phone, a smart phone, a radiotelephone, and/or the like), a wearable device (e.g., a smart watch, smart eyeglasses, smart clothing, and/or the like), an Internet of Things (IoT) device, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
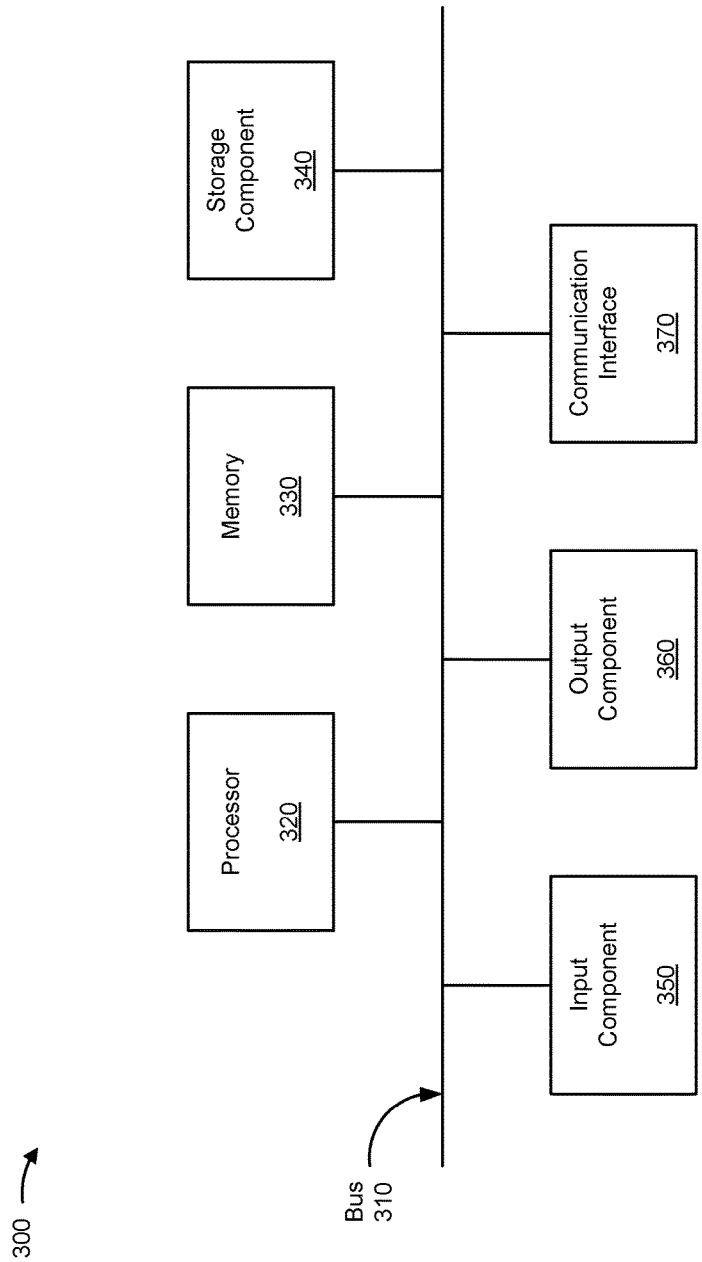
FIG. 3 is a diagram of example components of one or more devices of FIG. 2.

FIG. 3 is a diagram of example components of a device 300. Device 300 may correspond to ATM 205, data source/destination entity 225, user equipment 230, mode management module 235, transaction authorization components 245, transaction card 260, and/or user device 265. In some implementations, ATM 205, data source/destination entity 225, user equipment 230, mode management module 235, transaction authorization components 245, transaction card 260, and/or user device 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function.

Memory 330 includes a random access memory (RAM), a read only memory (ROM), and/or another type of dynamic or static storage device (e.g., a flash memory, a magnetic memory, and/or an optical memory) that stores information and/or instructions for use by processor 320. Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a RF interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, some implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
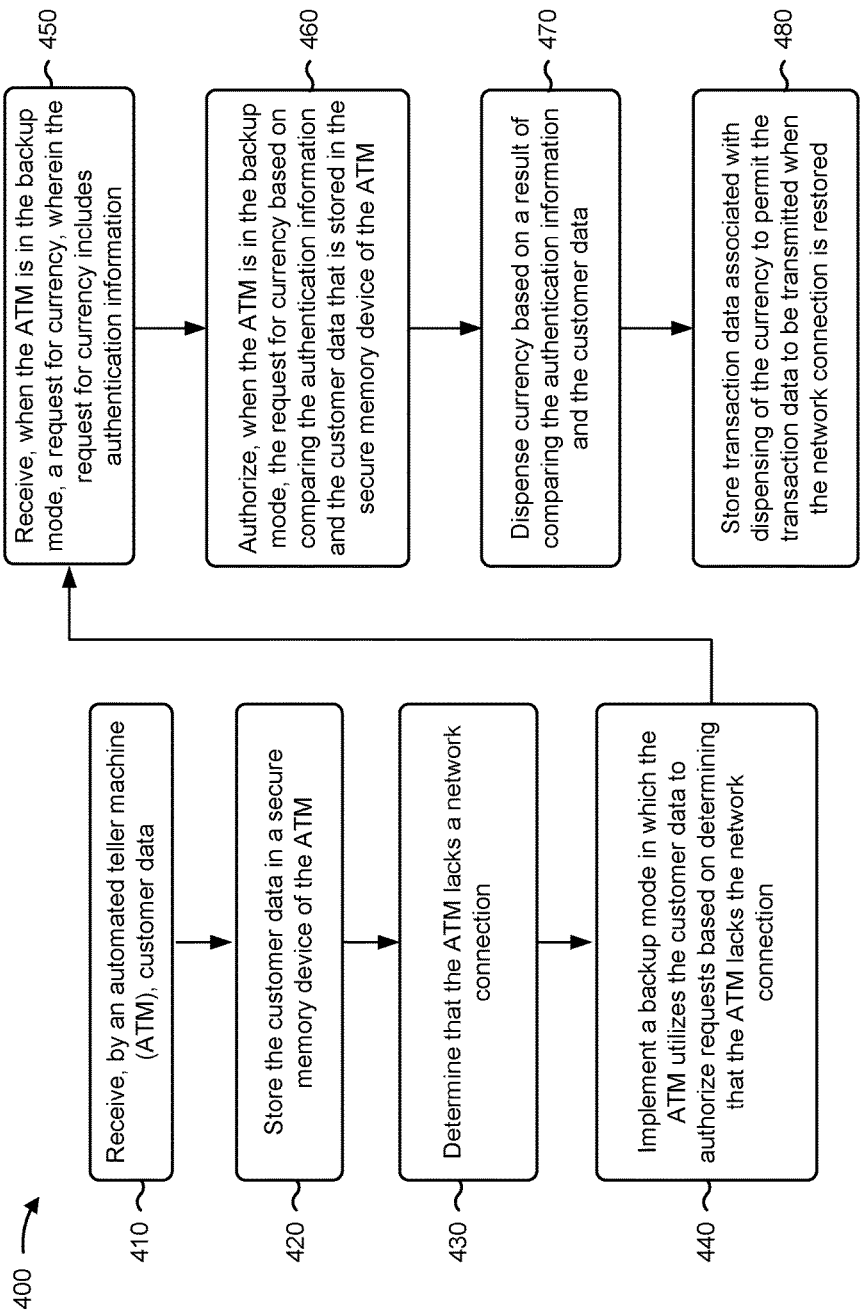
FIG. 4 is a flow chart of an example process performed by an offline automated teller machine (ATM).

FIG. 4 is a flow chart of an example process 400 performed by an offline ATM. In some implementations, one or more process blocks of FIG. 4 may be performed by an ATM (e.g., ATM 205). In some implementations, one or more process blocks of FIG. 4 may be performed by another device or a group of devices separate from or including ATM 205, data source/destination entity 225, user equipment 230, transaction card 260, and/or user device 265.

As shown in FIG. 4, process 400 may include receiving, by an ATM, customer data (block 410). For example, the ATM (e.g., ATM 205, using processor 320, memory 330, mode management module 235, transaction authorization components 245, secure memory device 250, storage component 340, communication interface 370, and/or the like) may receive customer data in a manner that is the same as or similar to that described with regard to FIGS. 1A-1C.

As shown in FIG. 4, process 400 may include storing the customer data in a secure memory device of the ATM (block 420). For example, the ATM (e.g., ATM 205, using one or more of processor 320, mode management module 235, transaction authorization components 245, memory 330, secure memory device 250, storage component 340, and/or the like) may store the customer data in the secure memory device (e.g., secure memory device 250) of the ATM in a manner that is the same as or similar to that described with regard to FIGS. 1A-1C.

As further shown in FIG. 4, process 400 may include determining that the ATM lacks a network connection (block 430). For example, the ATM (e.g., ATM 205, using processor 320, memory 330, mode management module 235, transaction authorization components 245, communication interface 370, and/or the like) may determine that the ATM lacks the network connection in a manner that is the same as or similar to that described with regard to FIGS. 1A-1C.

As further shown in FIG. 4, process 400 may include implementing a backup mode in which the ATM utilizes the customer data to authorize requests based on determining that the ATM lacks the network connection (block 440). For example, the ATM (e.g., ATM 205, using processor 320, memory 330, storage component 340, mode management module 235, transaction authorization components 245, secure memory device 250, communication interface 370, and/or the like) may implement a backup mode based on determining that the ATM lacks the network connection in a manner that is the same as or similar to that described with regard to FIGS. 1A-1C.

As further shown in FIG. 4, process 400 may include receiving, when the ATM is in the backup mode, a request for currency, wherein the request for currency includes authentication information (block 450). For example, the ATM (e.g., ATM 205, using processor 320, memory 330, mode management module 235, transaction authorization components 245, secure memory device 250, storage component 340, input component 350, output component 360, communication interface 370, and/or the like) may receive, when in the backup mode, a request for currency in a manner that is the same as or similar to that described with regard to FIGS. 1A-1C. In some implementations, the request for currency includes authentication information.

As further shown in FIG. 4, process 400 may include authorizing, when the ATM is in the backup mode, the request for currency based on comparing the authentication information and the customer data that is stored in the secure memory device of the ATM (block 460). For example, the ATM (e.g., ATM 205, using processor 320, mode management module 235, transaction authorization components 245, secure memory device 250, memory 330, storage component 340, and/or the like) may, when in the backup mode, authorize the request for currency based on comparing the authentication information and the customer data that is stored in the secure memory device (e.g., secure memory device 250) of the ATM in a manner that is the same as or similar to that described with regard to FIGS. 1A-1C.

As further shown in FIG. 4, process 400 may further include dispensing currency based on a result of comparing the authentication information and the customer data (block 470). For example, the ATM (e.g., ATM 205, using processor 320, mode management module 235, transaction authorization components 245, secure memory device 250, memory 330, storage component 340, input component 350, output component 360, communication interface 370, and/or the like) may dispense currency based on the result of comparing the authentication information and the customer data in a manner that is the same as or similar to that described with regard to FIGS. 1A-1C.

As further shown in FIG. 4, process 400 may include storing transaction data associated with dispensing of the currency to permit the transaction data to be transmitted when the network connection is restored (block 480). For example, the ATM (e.g., ATM 205, using mode management module 235, transaction authorization components 245, secure memory device 250, processor 320, memory 330, storage component 340, and/or the like) may store transaction data associated with dispensing of the currency to permit the transaction data to be transmitted when the network connection is restored in a manner that is the same as or similar to that described with regard to FIGS. 1A-1C.

Process 400 may include additional implementations, such as any single implementation or any combination of implementations described below and/or described with regard to any other process described herein.

In some implementations, process 400 may further include determining that the ATM is disconnected from a primary power source and routing electrical power from a battery to electrically power one or more ATM components based on determining that the ATM is disconnected from the primary power source.

In some implementations, process 400 may further include pairing to a user device prior to authorizing the request for currency so that only a single request for currency including the authentication information is authorized during a specified time period. In some implementations, the specified time period may be greater than or equal to approximately 24-hours.

In some implementations, the customer data may be associated with one or more customer account attributes. In some implementations, the one or more customer account attributes may include an indication of a customer account status, an indication of a customer account balance, indication of a customer account credit limit, and/or an indication of a customer account tier level.

In some implementations, process 400 may further include determining a maximum value of currency to be dispensed in advance of dispensing the currency, wherein the maximum value of currency is based on a real-time value of a total amount of currency available for dispensing by the ATM.

In some implementations, process 400 may include generating a transaction identifier that links the transaction data and the customer data and encrypting the transaction data prior to storing the transaction data. In some implementations, process 400 may include transmitting the transaction data based on determining that the network connection is restored.

In some implementations, the ATM may include a currency output component configured to dispense the currency based on a result of comparing the authentication information and the customer data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
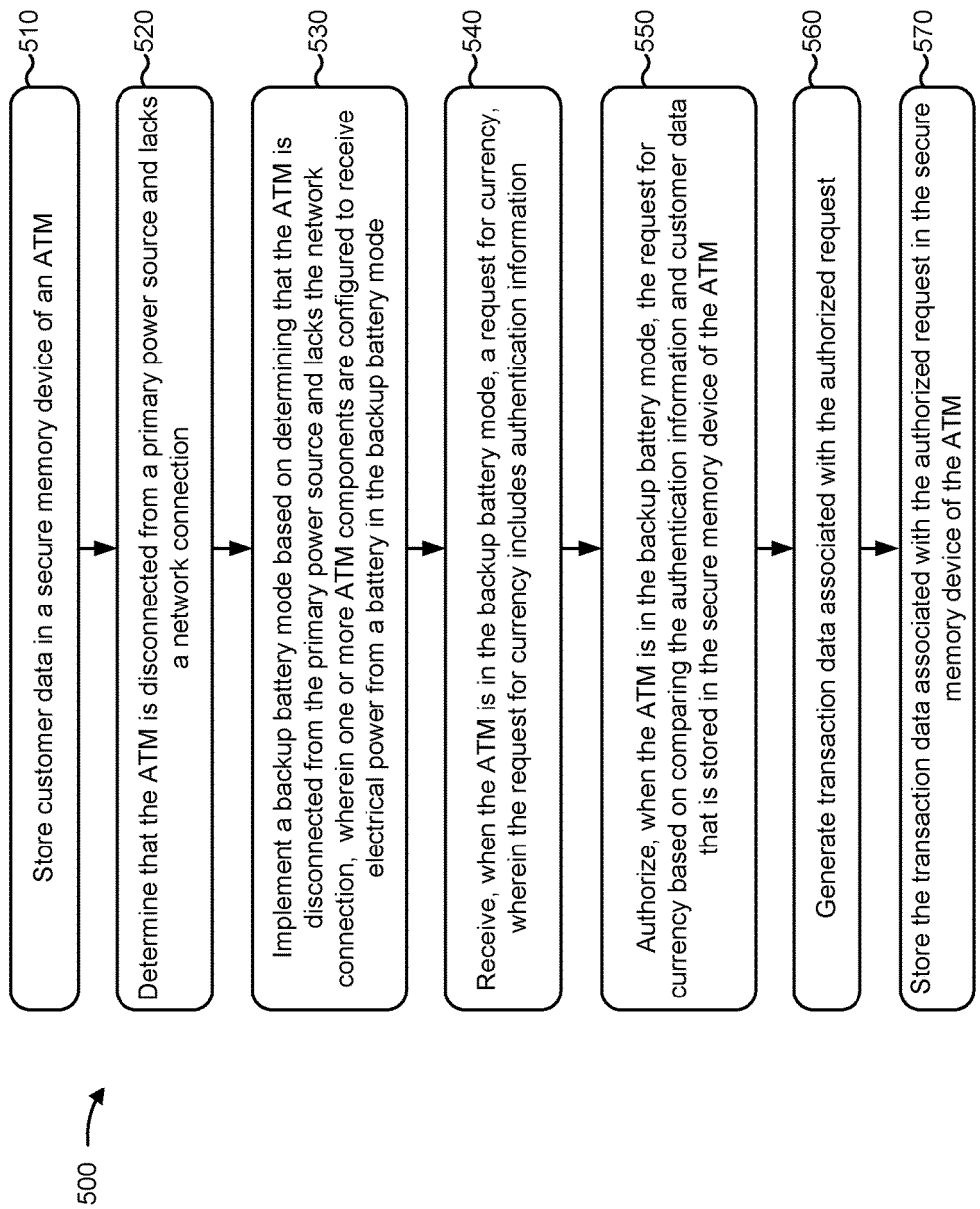
FIG. 5 is a flow chart of a further example process performed by an offline ATM.

FIG. 5 is a flow chart of an example process 500 performed by an offline ATM. In some implementations, one or more process blocks of FIG. 5 may be performed by an ATM (e.g., ATM 205). In some implementations, one or more process blocks of FIG. 5 may be performed by another device or a group of devices separate from or including ATM 205, data source/destination entity 225, user equipment 230, transaction card 260, and/or user device 265.

As shown in FIG. 5, process 500 may include storing customer data in a secure memory device of an ATM (block 510). For example, the ATM (e.g., ATM 205, using processor 320, memory 330, mode management module 235, transaction authorization components 245, secure memory device 250, storage component 340, communication interface 370, and/or the like) may store customer data in a manner that is the same as or similar to that described with regard to FIGS. 1A-1C.

As further shown in FIG. 5, process 500 may include determining that the ATM is disconnected from a primary power source and lacks a network connection (block 520). For example, the ATM (e.g., ATM 205, using processor 320, memory 330, mode management module 235, transaction authorization components 245, communication interface 370, and/or the like) may determine that the ATM is disconnected from the primary power source and lacks the network connection in a manner that is the same as or similar to that described with regard to FIGS. 1A-1C.

As further shown in FIG. 5, process 500 may include implementing a backup battery mode based on determining that the ATM is disconnected from the primary power source and lacks the network connection (block 530). For example, the ATM (e.g., ATM 205, using processor 320, memory 330, storage component 340, mode management module 235, transaction authorization components 245, secure memory device 250, communication interface 370, and/or the like) may implement the backup battery mode based on determining that the ATM is disconnected from the primary power source and lacks the network connection in a manner that is the same as or similar to that described with regard to FIGS. 1A-1C. In some implementations, one or more ATM components are configured to receive electrical power from a battery when in the backup battery mode.

As further shown in FIG. 5, process 500 may include receiving, when the ATM is in the backup battery mode, a request for currency (block 540). For example, the ATM (e.g., ATM 205, using processor 320, memory 330, mode management module 235, transaction authorization components 245, secure memory device 250, storage component 340, input component 350, output component 360, communication interface 370, and/or the like) may receive, when in the backup battery mode, the request for currency in a manner that is the same as or similar to that described with regard to FIGS. 1A-1C. In some implementations, the request for currency includes authentication information.

As further shown in FIG. 5, process 500 may include authorizing, when the ATM is in the backup battery mode, the request for currency based on comparing the authentication information and the customer data that is stored in the secure memory device of the ATM (block 550). For example, the ATM (e.g., ATM 205, using processor 320, mode management module 235, transaction authorization components 245, secure memory device 250, memory 330, storage component 340, and/or the like) may, when in the backup battery mode, authorize the request for currency based on comparing the authentication information and the customer data that is stored in the secure memory device (e.g., secure memory device 250) of the ATM in a manner that is the same as or similar to that described with regard to FIGS. 1A-1C.

As further shown in FIG. 5, process 500 may include generating transaction data associated with the authorized request (block 560). For example, the ATM (e.g., ATM 205, using mode management module 235, transaction authorization components 245, secure memory device 250, processor 320, memory 330, storage component 340, and/or the like) may generate transaction data associated with the authorized request in a manner that is the same as or similar to that described with regard to FIGS. 1A-1C.

As further shown in FIG. 5, process 500 may include storing the transaction data associated with the authorized request in the secure memory device of the ATM (block 570). For example, the ATM (e.g., ATM 205, using mode management module 235, transaction authorization components 245, secure memory device 250, processor 320, memory 330, storage component 340, and/or the like) may store the transaction data associated with the authorized request in the secure memory device of the ATM in a manner that is the same as or similar to that described with regard to FIGS. 1A-1C.

Process 500 may include additional implementations, such as any single implementation or any combination of implementations described below and/or described with regard to any other process described herein.

In some implementations, process 500 may further include determining a maximum value of currency to be dispensed based on authorizing the request for currency. In some implementations, the maximum value of currency is based on a real-time value of a total amount of currency available for dispensing by the ATM.

In some implementations, the ATM includes a currency output component configured to dispense the currency based on a result of comparing the authentication information and the customer data. In some implementations, the battery (i.e., battery 255) may be local to the ATM. In some implementations, the battery may be separate from the ATM. In some implementations, the battery may be connected to a renewable energy source (e.g., alternative power source 215). In some implementations, the renewable energy source may include one or more solar panels.

In some implementations, the customer data stored at the secure memory device (e.g., secure memory device 250) may be ATM specific. In some implementations, the customer data stored at the secure memory device may be associated with customers located in a specific geographic region in which the ATM is located.

In some implementations, process 500 may further include transmitting the transaction data based on determining that the ATM is reconnected to the primary power source and the network connection is restored.

In some implementations, process 500 may further include pairing to a user device prior to authorizing the request for currency so that only a single request for currency including the authentication information is authorized during a specified time period.

In some implementations, process 500 may further include encrypting the transaction data prior to the transaction data being stored at the secure memory device of the ATM.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein provide ATMs 205 that are capable of receiving, authorizing, and completing requests for currency despite losses or interruptions in power and communication infrastructure. Existing customers are able to withdraw currency from ATM 205 during power/network outages, emergency situations, and/or in the wake of a natural disaster. In this way, some implementations described herein enable ATM 205 to operate offline, thereby obviating the need to manage and deploy large amounts of currency reserves, as some amount of currency is likely to be available and on hand as ATM 205 is operable to dispense currency despite being offline. Additionally, some implementations described herein authorize requests for currency using customer data that is encrypted, and can prevent hackers from the unauthorized access of the data. Additionally, some implementations described herein maintain transaction data in the secure memory device of the ATM after request for currency are authorized and completed so that the records can be assessed when the power and/or network connections are restored. In this way, ATM 205 described herein can allow accounts to be reconciled when reconnected to the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in connection with thresholds (e.g., account balance thresholds). As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that the devices, systems, and/or methods, described herein, may be implemented in different forms of hardware, firmware, or a combination of hardware and software. The actual specialized control hardware or software code used to implement these systems and/or methods is not limiting of the implementations. Thus, the operation and behavior of the devices, systems, and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a processor of an automated teller machine (ATM), customer data via a primary network connection;
   storing, by the processor, the customer data in a memory device of the ATM;
   determining, by the processor, that the ATM is disconnected from a primary power source;
   implementing, by the processor, a backup mode based on determining that the ATM is disconnected from the primary power source,
      wherein one or more ATM components are configured to receive electrical power from a battery when the ATM is in the backup mode,
         the one or more ATM components including the memory device of the ATM, and
      wherein the ATM is disconnected from the primary network connection when the ATM is in the backup mode;
   receiving, by the processor and when the ATM is in the backup mode, a request for currency,
      wherein the request for currency includes authentication information;
   authorizing, by the processor and when the ATM is in the backup mode, the request for currency based on comparing the authentication information and the customer data that is stored in the memory device of the ATM;
   dispensing, by the processor and when the ATM is in the backup mode, currency based on a result of comparing the authentication information and the customer data;
   storing, by the processor and when the ATM is in the backup mode, transaction data associated with dispensing of the currency;
   determining, by the processor and after implementation of the backup mode, that the ATM is reconnected to the primary network connection; and
   transmitting, by the processor and to another device and based on determining that the ATM is reconnected to the primary network connection, the transaction data,
      the transaction data being transmitted to the other device via the primary network connection.

2. The method of claim 1, wherein implementing the backup mode comprises:
   routing, by the processor, electrical power from the battery to electrically power the one or more ATM components.

3. The method of claim 1, further comprising:
   pairing to a user device prior to authorizing the request for currency; and
   providing the user device with instructions to transmit the transaction data so that only a single request for currency including the authentication information is authorized during a specified time period.

4. The method of claim 3, wherein the specified time period is greater than or equal to approximately 24 hours.

5. The method of claim 1, wherein the customer data is associated with one or more customer account attributes, and
   wherein authorizing the request for currency is further based on the one or more customer account attributes.

6. The method of claim 5, wherein the one or more customer account attributes include at least one of:
   an indication of a customer account status,
   an indication of a customer account balance,
   an indication of a customer account credit limit, or
   an indication of a customer account tier level.

7. The method of claim 1, further comprising:
   determining a maximum value of currency to be dispensed in advance of dispensing the currency, wherein the maximum value of currency is based on a real-time value of a total amount of currency available for dispensing by the ATM.

8. The method of claim 1, further comprising:
   generating a transaction identifier that links the transaction data and the customer data prior to storing the transaction data; and
   encrypting the transaction data prior to storing the transaction data.

9. An automated teller machine (ATM), comprising:
   a memory device configured to locally store customer data at the ATM; and
   one or more processors configured to:
      receive the customer data via a primary network connection;
      determine that the ATM is disconnected from a primary power source and lacks the primary network connection;
      implement a backup mode based on determining that the ATM is disconnected from the primary power source,
         wherein one or more ATM components are configured to receive electrical power from a battery when the ATM is in the backup mode,
            the one or more ATM components including the memory device, and
         wherein the ATM is disconnected from the primary network connection when the ATM is in the backup mode;
      receive a request for currency when the ATM is in the backup mode,
         wherein the request for currency includes authentication information;
      authorize the request for currency when the ATM is in the backup mode based on comparing the authentication information and the customer data that is stored in the memory device of the ATM;
      dispense, when the ATM is in the backup mode, currency based on a result of comparing the authentication information and the customer data;
      generate, when the ATM is in the backup mode, transaction data associated with dispensing of the currency;
      link, when the ATM is in the backup mode, the transaction data to the customer data using a transaction identifier;
      determine, after implementation of the backup mode, that the ATM is reconnected to the primary network connection; and
      transmit, to another device and based on determining that the ATM is reconnected to the primary network connection, the transaction data,
         the transaction data being transmitted to the other device via the primary network connection.

10. The ATM of claim 9, further comprising:
    a currency output component configured to dispense the currency based on the result of comparing the authentication information and the customer data.

11. The ATM of claim 9, wherein the battery is local to the ATM.

12. The ATM of claim 9, wherein the battery is separate from the ATM.

13. The ATM of claim 9, wherein the battery is connected to a renewable energy source.

14. The ATM of claim 13, wherein the renewable energy source comprises one or more solar panels.

15. The ATM of claim 9, wherein the customer data stored at the memory device is ATM specific.

16. The ATM of claim 9, wherein the customer data stored at the memory device is associated with customers associated with a matching zip code that matches a region in which the ATM is located.

17. A non-transitory computer-readable medium storing instructions comprising:
one or more instructions that, when executed by one or more processors of an automated teller machine (ATM), cause the one or more processors to:
receive customer data via a primary network connection;
determine that the ATM is disconnected from a primary power source and lacks the primary network connection;
implement a backup mode based on determining that the ATM is disconnected from the primary power source,
wherein one or more ATM components are configured to receive electrical power from a battery when the ATM is in the backup mode,
the one or more ATM components including a memory device of the ATM, and
wherein the ATM is disconnected from the primary network connection when the ATM is in the backup mode;
receive a request for currency when the ATM is in the backup mode,
wherein the request for currency includes authentication information;
authorize the request for currency when the ATM is in the backup mode based on comparing the authentication information and the customer data that is stored in the memory device of the ATM;
dispense, when the ATM is in the backup mode, currency based on a result of comparing the authentication information and the customer data;
generate, when the ATM is in the backup mode, transaction data associated with dispensing of the currency;
linking, when the ATM is in the backup mode, the transaction data to the customer data using a transaction identifier;
determine, after implementation of the backup mode, that the ATM is reconnected to the primary network connection; and
transmit, to another device and based on determining that the ATM is reconnected to the primary network connection, the transaction data,
the transaction data being transmitted to the other device via the primary network connection.

18. The non-transitory computer-readable medium of claim 17, wherein the one or more instructions, when executed by the one or more processors, further cause the one or more processors to:
determine a maximum value of currency to be dispensed based on authorizing the request for currency,
the maximum value of currency being based on a real-time value of a total amount of currency available for dispensing by the ATM.

19. The non-transitory computer-readable medium of claim 17, wherein the one or more instructions, that cause the one or more processors to authorize the request for currency, further cause the one or more processors to:
authorize the request for currency based on one or more customer account attributes associated with particular customer data, of the customer data,
the particular customer data being identified based on the authentication information.

20. The non-transitory computer-readable medium of claim 19, wherein the one or more customer account attributes include at least one of:
an indication of a customer account status,
an indication of a customer account balance,
an indication of a customer account credit limit, or
an indication of a customer account tier level.

* * * * *